United States Patent
Ma et al.

(10) Patent No.: US 10,073,201 B2
(45) Date of Patent: Sep. 11, 2018

(54) SEE THROUGH NEAR-EYE DISPLAY

(71) Applicant: QUALCOMM Incorporated, San Diego, CA (US)

(72) Inventors: Jian J. Ma, San Diego, CA (US); John H. Hong, San Clemente, CA (US); Tallis Y. Chang, San Diego, CA (US); Chong U. Lee, San Diego, CA (US); Robert Sean Daley, Del Mar, CA (US); Frederick D. Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 671 days.

(21) Appl. No.: 13/662,251

(22) Filed: Oct. 26, 2012

(65) Prior Publication Data
US 2014/0118829 A1    May 1, 2014

(51) Int. Cl.
*G02B 5/18*    (2006.01)
*G02B 27/01*    (2006.01)

(52) U.S. Cl.
CPC ........ *G02B 5/1885* (2013.01); *G02B 27/0172* (2013.01); *G02B 2027/0174* (2013.01)

(58) Field of Classification Search
CPC .............. G02B 5/1885; G02B 27/0172; G02B 2027/0174; G02B 27/017; G02B 27/1086;
(Continued)

(56) References Cited

U.S. PATENT DOCUMENTS

| 5,499,138 A | 3/1996 | Iba |
| 7,715,103 B2 | 5/2010 | Sprague et al. |

(Continued)

FOREIGN PATENT DOCUMENTS

| CN | 101149472 A | 3/2008 |
| EP | 0543718 A1 | 5/1993 |

(Continued)

OTHER PUBLICATIONS

International Search Report and Written Opinion—PCT/US2013/066650, International Search Authority—European Patent Office, Dec. 20, 2013.

*Primary Examiner* — Mustak Choudhury
(74) *Attorney, Agent, or Firm* — Kilpatrick Townsend & Stockton

(57) ABSTRACT

The various embodiments include a near-eye display having a transmissive display and a diffractive micro-lens array. The transmissive display may be positioned relative to the diffractive micro-lens array so that the distance between the transmissive display and the diffractive micro-lens array is be approximately equal to focal length of the diffractive micro-lens array. The transmissive display may also be positioned relative to the diffractive micro-lens array so that a percentage of light emitted from the transmissive display is diffracted by the micro-lens array and collimated into focus on a retina of a human eye. The transmissive display may be further positioned relative to the diffractive micro-lens array so that light from a real world scene passes through transparent portions of the transmissive display and is diffracted by the micro-lens array out of focus of the human eye.

17 Claims, 14 Drawing Sheets

(58) Field of Classification Search
CPC ............... G02B 5/1819; G02B 5/1842; G02F 2201/307; G03H 2225/11; G03H 2225/25; G03H 2226/05; H04N 13/044
USPC .......... 359/13, 566–575, 630, 649, 449–455; 348/8, 419
See application file for complete search history.

(56) References Cited

U.S. PATENT DOCUMENTS

| | | | |
|---|---|---|---|
| 2003/0025849 A1* | 2/2003 | Hara ................... | G02B 27/017 349/56 |
| 2004/0032659 A1 | 2/2004 | Drinkwater | |
| 2004/0085648 A1 | 5/2004 | Tomono | |
| 2004/0108971 A1* | 6/2004 | Waldern et al. .................. | 345/8 |
| 2005/0195491 A1* | 9/2005 | Bernard et al. ............... | 359/649 |
| 2009/0067057 A1* | 3/2009 | Sprague ............. | G02B 27/0101 359/630 |
| 2010/0277803 A1* | 11/2010 | Pockett .............. | G02B 27/4277 359/567 |
| 2011/0214082 A1 | 9/2011 | Osterhout et al. | |
| 2012/0068913 A1 | 3/2012 | Bar-Zeev et al. | |
| 2012/0120498 A1* | 5/2012 | Harrison ................. | G02B 3/08 359/630 |
| 2014/0043320 A1* | 2/2014 | Tosaya ............... | G02B 27/0172 345/419 |

FOREIGN PATENT DOCUMENTS

| | | |
|---|---|---|
| EP | 1571839 A1 | 9/2005 |
| JP | 2000506998 A | 6/2000 |
| JP | 2003121779 A | 4/2003 |
| JP | 2005250478 A | 9/2005 |
| WO | 9735223 A1 | 9/1997 |

* cited by examiner

Prior Art

Prior Art

Prior Art

SEE THROUGH NEAR-EYE DISPLAY

FIELD OF THE INVENTION

The present application relates generally to displays for computing devices, and more specifically to a near-eye display that allows a human eye to simultaneously focus on real world images and computer generated images that can be overlaid with the real world images.

BACKGROUND

Cellular and wireless communication technologies have seen explosive growth over the past several years. Cellular service providers now offer a wide array of features and services that provide their users with unprecedented levels of access to information, resources and communications. To keep pace with these service enhancements, mobile electronic devices (e.g., cellular phones, tablets, laptops, etc.) have become more feature rich, and now commonly include powerful processors, graphics hardware, cameras, global positioning system (GPS) receivers, and many other components for connecting users to friends, work, leisure activities and entertainment. Due to these improvements, mobile device users can now execute powerful software applications on their mobile devices, such as augmented reality software applications that combine real world images from a user's physical environment with computer-generated imagery. As a result of these and other enhancements, mobile devices have become ubiquitous and mobile device users now expect to have access to content, data and communications at any time, in any place.

With the ubiquity of mobile devices, and the nearly continuous access to applications and communications that they provide, mobile device users are being drawn into a deeper engagement with their mobile devices and becoming less aware of their physical surroundings. For these and other reasons, an electronic display that enables mobile device users to simultaneously focus on their physical surroundings and computer generated images/content will be beneficial to consumers.

SUMMARY OF THE INVENTION

An embodiment near-eye display may include a transmissive electronic display, and a diffractive micro-lens array configured to diffract a percentage of incoming light to form a virtual image of the display at a distance greater than or equal to 250 mm from a user's eye, in which the distance between the transmissive electronic display and the micro-lens array is about the focal length of the micro-lens array. The diffractive micro-lens array may be partially diffractive and partially transparent. The transmissive electronic display may include a plurality of pixels and the diffractive micro-lens array may be positioned relative to the pixels so that about fifty percent of light emitted from each pixel is diffracted into focus on a retina of a user's eye. The transmissive electronic display may include a plurality of transparent portions and the diffractive micro-lens array may be configured and positioned relative to the transmissive electronic display so that light from a distant scene passes unaltered through the transparent portions of the transmissive display. The diffractive micro-lens array may be positioned relative to the transmissive electronic display so that about fifty percent of the light from the real world scene passes through the diffractive micro-lens array and forms an image on the retina. The diffractive micro-lens array may be positioned relative to the transmissive electronic display so that about fifty percent of the light from the real world scene is diffracted by the micro-lens array out of focus of the user's retina. The diffractive micro-lens array may be fabricated on a glass substrate and/or fabricated into a photopolymer film as a volume hologram. The diffractive micro-lens array and transmissive electronic display may be fabricated into an optical lens, which may be part of or attached to a pair of eyeglasses. The transmissive electronic display may a liquid crystal display. The transmissive electronic display may be an organic light emitting diode display, which may be a transparent organic light emitting diode display.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
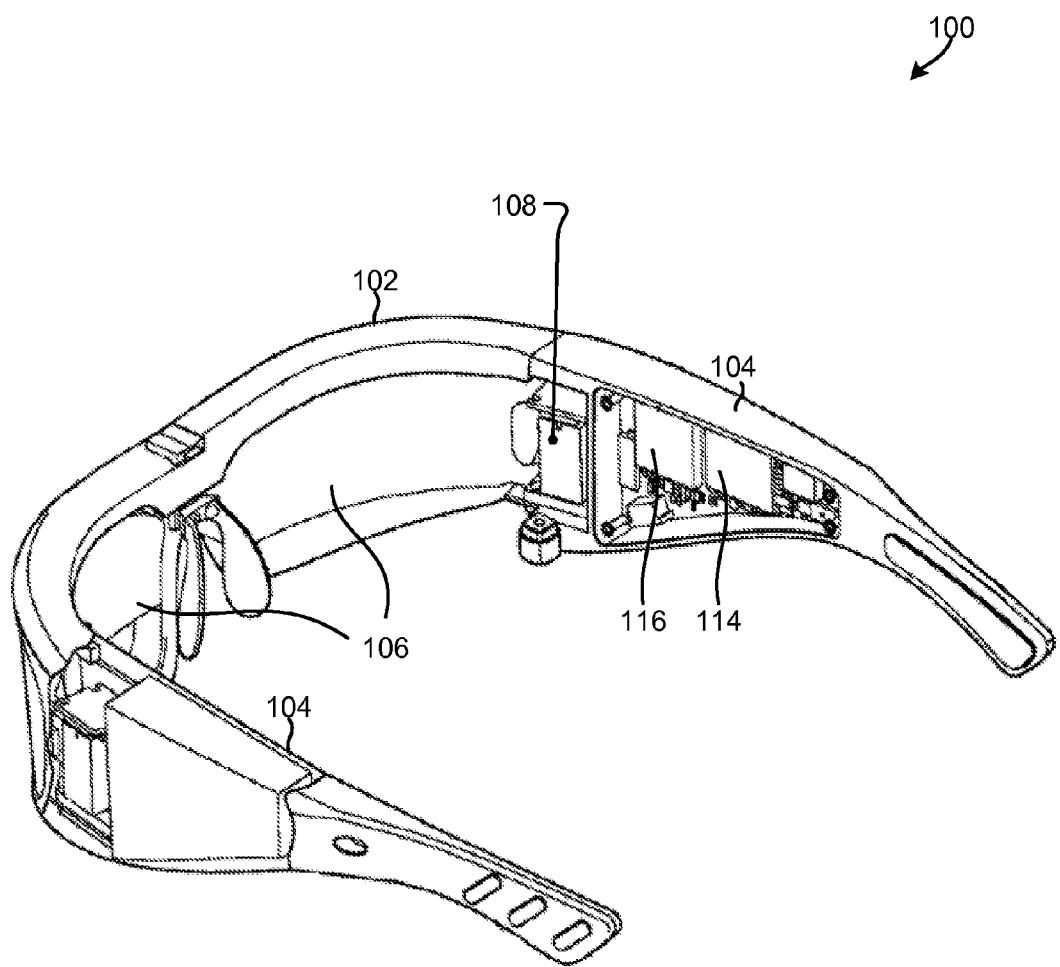
FIGS. 1A-1C are illustrations of components commonly included in prior art augmented reality glasses.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "user equipment," and "handheld device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a programmable processor, memory, and circuitry for sending and/or receiving wireless communication signals.

The term "pixel" is used herein to refer to smallest addressable discrete element in an electronic display device. Typically, the greater the number of pixels per unit area, the greater the resolution of the electronic display device.

The phrase "heads-up display" and its acronym "HUD" are used herein to refer to any electronic display system that presents the user with information without requiring users to look away from their usual viewpoints.

The term "near-eye display" is used herein to refer to an optical display device that may be worn in close proximity to one or both of a user's eyes. A near-eye display may be included in a contact lens, eyeglasses, head mounted displays (e.g., as part of a helmet or on the face of an individual), heads-up display, virtual reality glasses, augmented reality glasses, electronic goggles, and other similar technologies/devices.

Due to recent advances in mobile device technologies, mobile device users can now execute powerful software applications on their mobile devices, such as augmented reality software applications that combine real world images from a user's physical environment with computer-generated imagery. An augmented reality application may add graphics, sounds, and/or haptic feedback to the natural world that surrounds a user of the application. Information about people and/or objects present in the user's physical environment may be retrieved from a database presented to the user on an electronic display so that the user can view and/or interact with the representations of the real-world people/objects. As an example, a mobile device augmented reality application may capture an image of a building in the mobile device user's field of view, perform image matching or other operations to identify the building, retrieve information pertaining to the identified building from a database, and overlay the retrieved information on the image of the building so that the user can view the information within the context of the building. As another example, a mobile device augmented reality application may identify the presence of a human face in the user's vicinity, perform facial recognition operations to identify the individual whose face was detected, retrieve an avatar, a website, or information associated with the identified individual from a database (e.g., a local database, Internet, etc.), and display the retrieved information in proximity to the detected human face. While these new mobile device features, capabilities, and applications (e.g., augmented reality applications) may be beneficial to consumers, they also have the potential to draw users into deeper engagement with their mobile devices, distract them from their physical surroundings, and/or isolate them from the real-world.

The various embodiments provide a near-eye display capable of displaying electronic or computer generated images on eyeglasses so they appear superimposed on the real-world scene (i.e., what the user would see without the glasses). This enables the user to view the generated image in the context of the real-world scene without requiring the user to look away from his/her usual viewpoints. In an embodiment, a near-eye display may be embedded in an optical lens of a pair of lightweight and inconspicuous eyeglasses or contact lenses that may be worn very close to a human eye for extended periods of time without causing significant eye fatigue or blocking the user's peripheral vision. Embedding the near-eye display in the glasses eliminates the bulk and weight of projection and long-focal length displays used in conventional near-eye displays and heads up displays.

In an embodiment, the near-eye display may include a transmissive display and a diffractive micro-lens array. The transmissive display may be positioned very close to the diffractive micro-lens array so that the distance between the transmissive display and the diffractive micro-lens array is be approximately equal to the focal length of the diffractive micro-lens array. In an embodiment, the transmissive display may be positioned relative to the diffractive micro-lens array so that a percentage of light emitted from the transmissive display is diffracted by the micro-lens array and collimated so that, when worn, the display images will focus on the retina of a user's eye so that the light appears to originate at a distance of about 250 mm or more from the user. Also, the transmissive display may be positioned relative to the diffractive micro-lens array so that light from a real world scene passes through transparent portions of the transmissive display without diffraction by the micro-lens array so that it can be seen by the user. Any light from the real world scene that is diffracted by the micro-lens array will be rendered out of focus on the human eye such that the diffracted light is ignored by the user's brain.

Generally, the human eye functions by focusing light rays through the lens onto an assemblage of photoreceptor cells in the human retina. Focusing of light is achieved by contracting or relaxing a series of muscles that change the physical shape of the eye and thus the distance between the lens and the retina. To focus on nearby objects, a normal human eye contracts various muscles to cause the eye lens to bulge and reduce the distance between the lens and the retina. The closest distance that human eye can focus is from 10 cm (young people) to 50 cm (old people). When the muscles are relaxed, the eye elongates and the eye is "focused at infinity." A human eye is typically focused at infinity when the light publication distance (i.e., distance between the generated image and the user's eye) is around two feet. The average human eye is much more comfortable when focused at infinity than when focused on nearby objects, and prolonged focus on nearby objects typically causes eye fatigue. For these and other reasons, conventional display technologies and image generation techniques are not suitable for use in near-eye displays, such as eye glasses, which are worn in close proximity to the eye (e.g., less than a few inches).

Figure 1B:
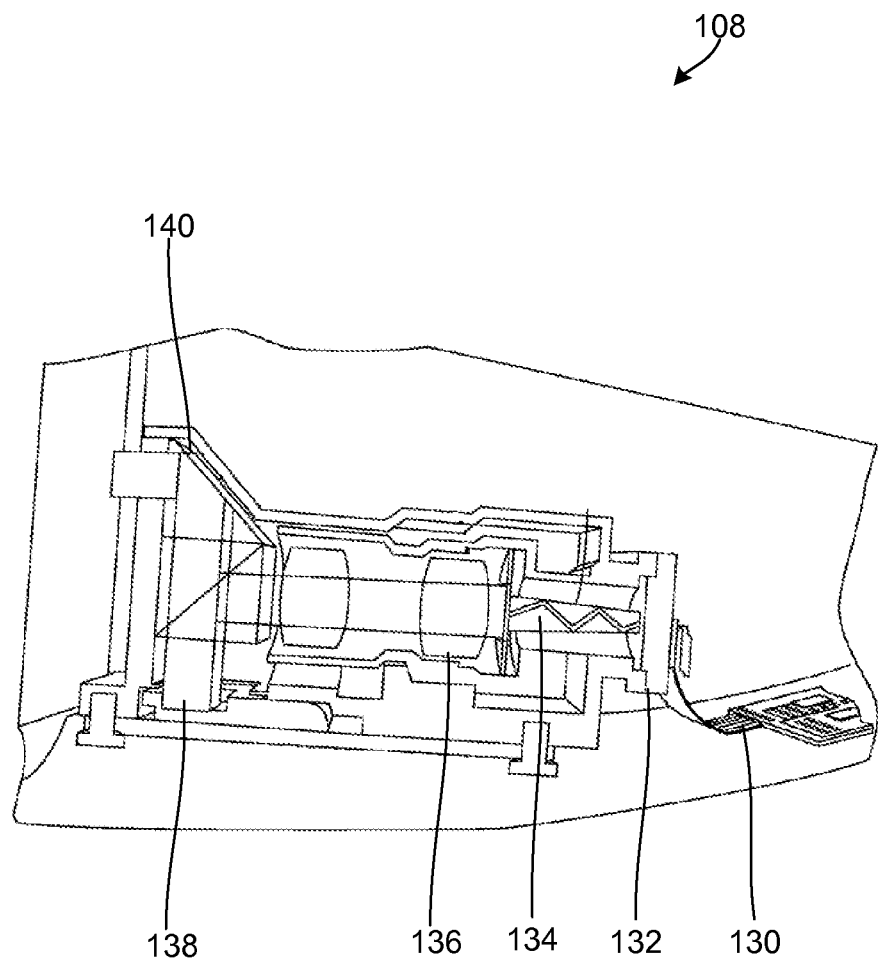
Figure 1C:
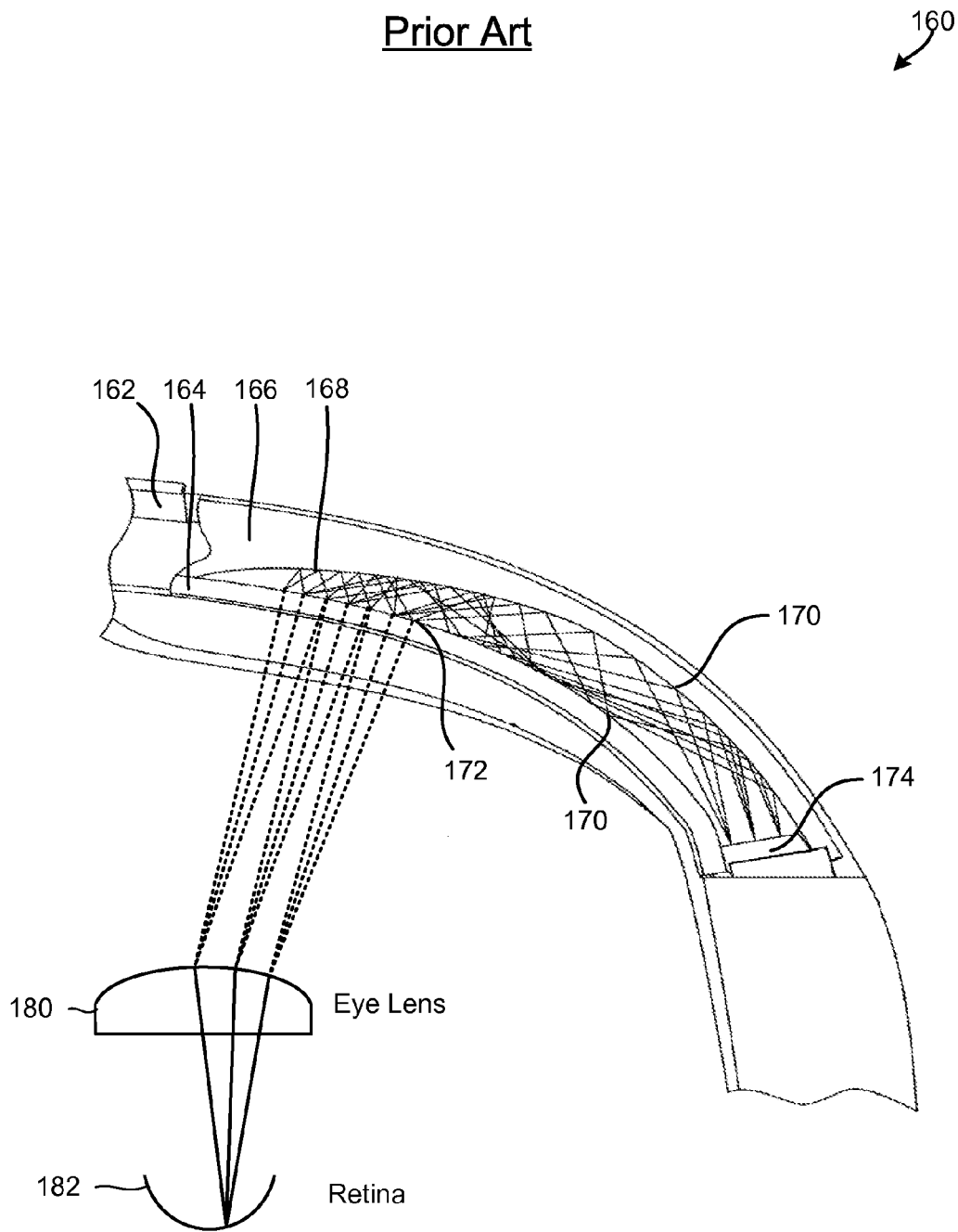

FIGS. 1A-1C illustrate various components of a pair of prior art augmented reality glasses 100 configured to generate an electronic image in close proximity to the human eye. FIG. 1A illustrates that augmented reality glasses 100 may include a frame 102, two optical lenses 106, a processor 114, a memory 116 and a projector 108. The projector 108 may be embedded in arm portions 104 of the frame 102 and configured to project images onto the optical lenses 106.

FIG. 1B illustrates example components of a typical projector 108 that may be embedded an arm portion 104 of the augmented reality glasses 100. The projector 108 may include a communication circuitry 130 for sending and/or receiving information to and from the processor 114, a light-emitting diode (LED) module 132, a light tunnel 134, a homogenizing lens 136, an optical display 138, a fold mirror 140, and other well known components commonly included in prior art projectors. Briefly, the LED module 132 generates a beam of light that travels through the light tunnel 134 and the homogenizing lens 136 before being deflected towards the optical display 138. The optical display 138 combines the received light beam with other light beams (e.g., other colors) to generate an image. The generated image may be reflected off the fold mirror 140, through a collimator and/or a relay imaging system, and onto the optical lens 106 of the augmented reality glasses 100.

Due to the relatively short distances between the optical lens 106 and the eye lens of the user, a relay imaging system must extend the distance between the generated image and the user's eye (i.e., light publication distance) to a distance larger than 50 cm so that the users of all ages can focus on the generated image.

FIG. 1C illustrates components of a relay imaging system 160 suitable for displaying an image on an optical lens 106 of prior art augmented reality glasses 100. The relay imaging system 160 extends the distance between the generated image and the user's eye so that the user can focus on the generated image. In the example illustrated in FIG. 1C, the relay imaging system 160 includes a composite optical lens 162 having a first lens 164, a second lens 166, and a waveguide 168. The waveguide 168 includes a plurality of reflective sections 170 and a transparent section 172. Light beams from the optical display 138 enter a composite lens 162 via a collimator 174 that narrows and focuses the light beams onto reflective sections 170 of the waveguide 168. The light beams bounce off the reflective sections 170 until they reach the transparent section 172 of the waveguide 168. The light beams pass through the transparent section 172, through the first lens 164, onto the eye lens 180, and is focused on the retina 182 of a user of the augmented reality glasses 100.

As mentioned above, a human eye is typically focused at infinity when the light publication distance is around two feet. Achieving this distance using relay optics often requires bulky lenses that may cause the glasses to be uncomfortable to wear, conspicuous, unattractive, heavy, and otherwise unappealing to consumers. Further, relay optics typically block a significant amount of incoming light from a real-world scene, which may reduce the user's peripheral vision and/or isolate the user from his/her natural environment. In addition, by blocking significant amounts of incoming light from a real-world scene, existing augmented reality solutions do not provide a seamless integration between the generated image and a real-world scene.

Figure 2:
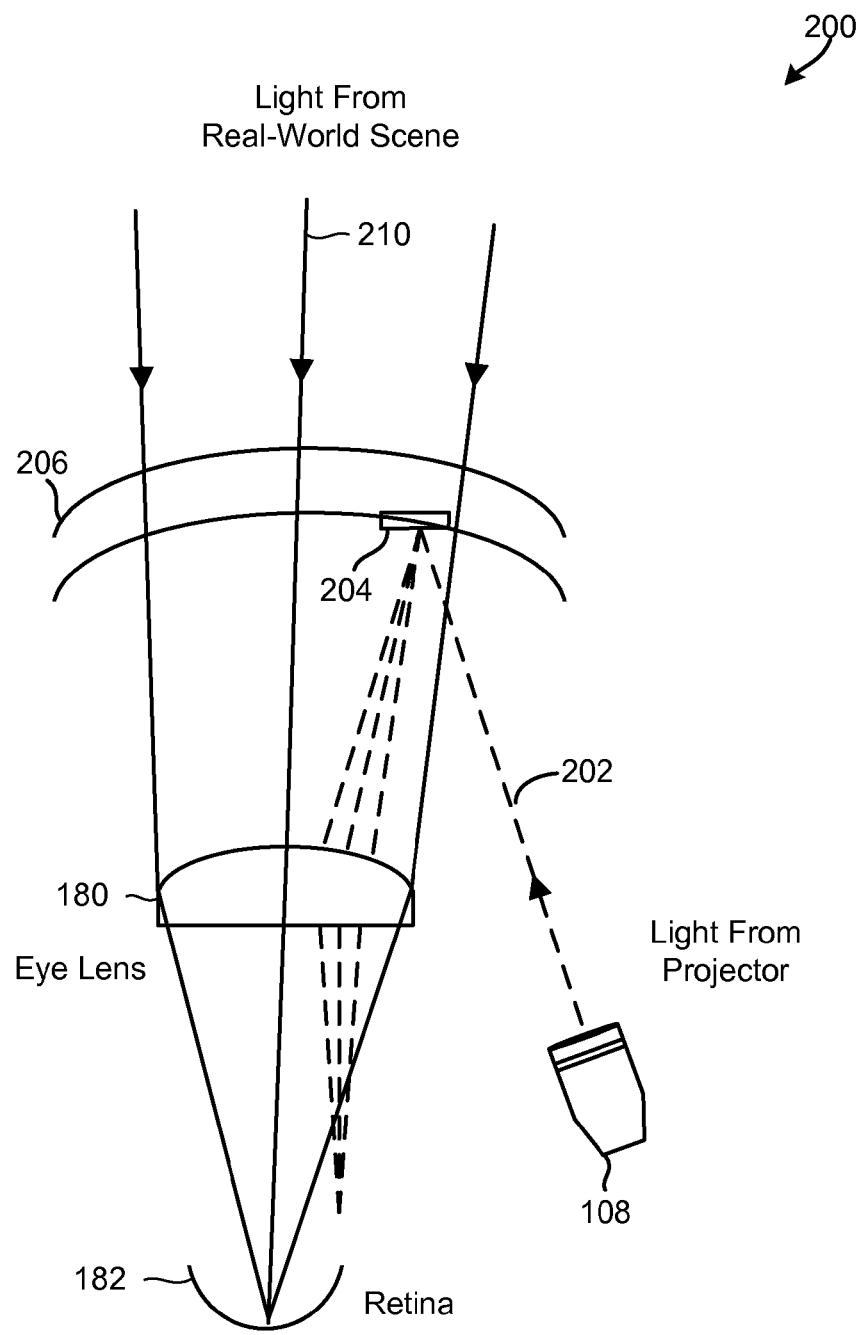
FIG. 2 is an illustration of imaging system suitable for displaying electronically generated images on a prior art heads-up display system.

Another known technology for integrating projected images with real world scenes is a heads up display. FIG. 2 illustrates an example imaging system 200 for displaying electronically generated images on a conventional heads-up display configured to present the user with information without requiring the user to look away from his or her usual viewpoints. FIG. 2 illustrates that light 202 emitted from the projector 108 may be reflected off one or more mirrored or semi-transparent portions 204 of an optical lens or windshield 206 onto the eye lens 180 of the user/user. Light 210 from a real word scene may pass through the non-mirrored portions of the optical lens/windshield 206 to reach the user's eye lens 180.

When the imaging system 200 is implemented in a conventional heads-up display system, such as those used in automobiles and aircraft, the image displayed on the projector 108 must be located at a significant distance (e.g., two or more feet) from the user's eyes so that the user is able to focus on the generated image (e.g., the user's eye may remain focused at infinity). Therefore, existing heads-up display solutions and technologies are not suitable for implementation in near-eye displays, such as eyeglasses and contact lenses, which are worn in close proximity to the user's eye.

In the case of augmented reality glasses, projecting the generate image directly on a glass surface of an optical lens will not form an image on the retina, and use of re-imaging lenses will cause the real-world scene to become distorted by the lens. If the generated image is projected to the side of the glasses, light 210 from the real world scene and light 202 from the projector do not overlap on the user's retina. Further, the image from the projector may not be in the field of view of the user's eye when his/her eyes are focused on the real world scene, and vice versa. For these and other reasons, implementing the imaging system 200 in near-eye display does not provide a seamless integration between the real-world scene and the generated images.

In addition to the above-mentioned limitation of existing solutions, the relay imaging systems discussed above require that the projector 108 be positioned inside or within the optical lens/windshield 162, 206 so that light 202 emitted from the projector 108 can be reflected off the reflective portions 170, 204 of the optical lens/windshield 162, 206. In the case of augmented reality glasses, this is typically achieved by positioning the projector 180 within the frame 102, which requires that the frame 102 be made of thick, heavy, and/or bulky material that consumers may find uncomfortable, conspicuous, unattractive, heavy, and otherwise unappealing. For these and other reasons, existing virtual/augmented reality systems and near-eye display solutions are not suitable for use in near-eye displays and/or are unappealing to consumers.

The various embodiments provide a near-eye display capable of combining a real-world scene (i.e., what the user would see without the display) with an electronic or computer generated image so that the user views the generated image in the context of the real-world scene without causing significant eye fatigue or blocking peripheral vision. The various embodiments provide a near-eye display system that allows a human eye to simultaneously focus on both the real world and generated images by relaying the generated image to infinity without the bulky relay optics required in prior art solutions. Various embodiments seamlessly integrate the real-world scene and the generated images in a manner that does not contribute to eye fatigue or cause user distraction/isolation.

Figure 3A:
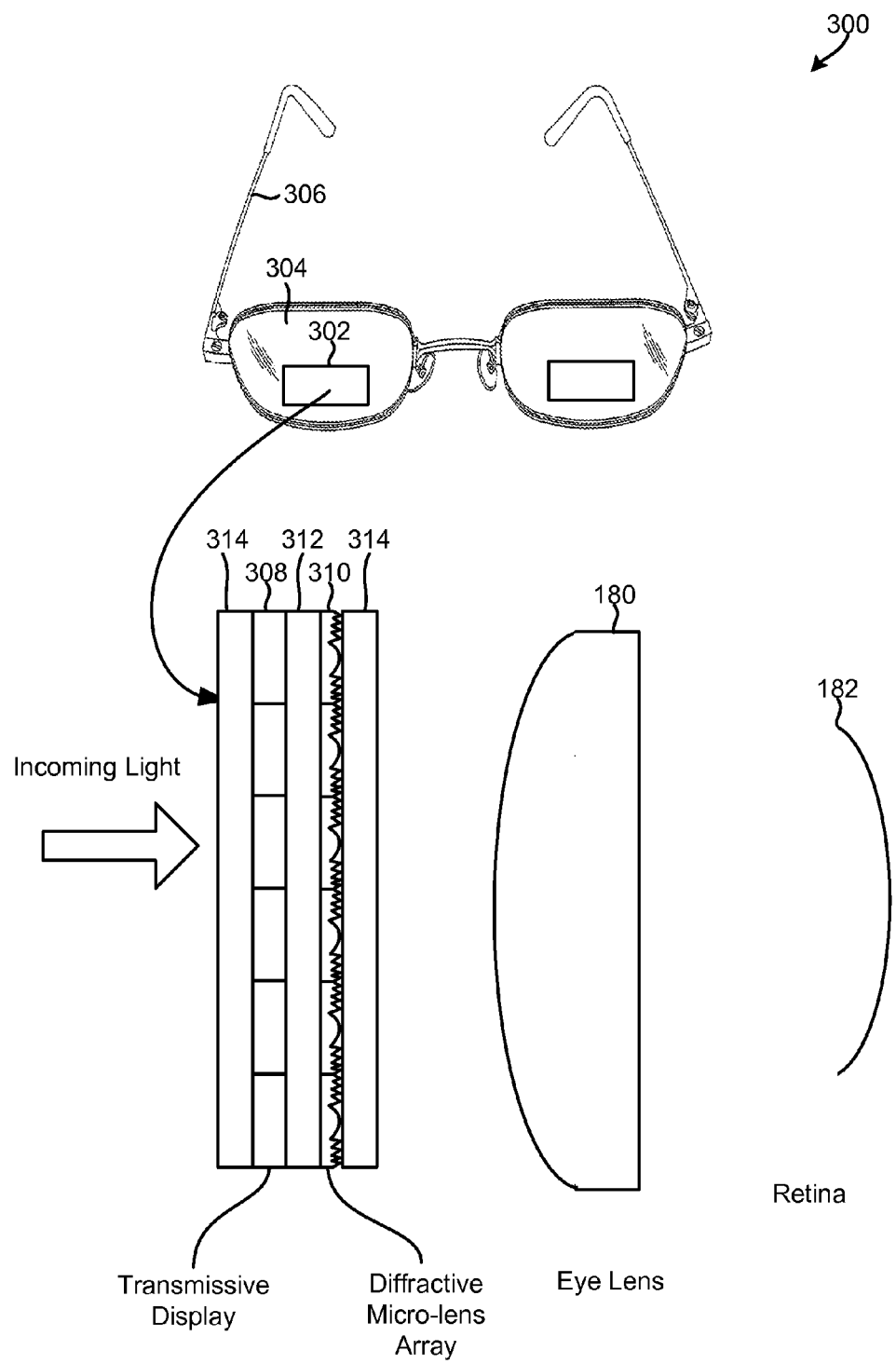
FIG. 3A is an illustration of an embodiment near-eye display system in the form of eyeglasses.

FIG. 3A illustrates components of an embodiment near-eye display system 300 in the form of a pair of eyeglasses 306. The eyeglasses 306 may be rimless, wireframe, plastic frame, wood frame, horn-rimmed, browline, pince-nez, safety glasses, sunglasses, or any other type of eyewear or eyeglasses currently available or which may be developed in the future. In the example illustrated in FIG. 3A, the eyeglasses 306 include a frame 306 for supporting optical lenses 304 in front of a user's eyes. The frame 306 may be constructed from a lightweight material (e.g., polymer, alloy, metal, wood, etc.) suitable for supporting the optical lenses 304 in front of the user's eyes. The optical lenses 304 may be prescription lenses, non-prescription lenses, vision correction lenses, magnification lenses, polarized lenses, darkened lenses, photochromic lenses, or just a piece of transparent glass or plastic substrate, or any other type of eyeglass lens currently available or which may be developed in the future.

The optical lens 304 may include a near-eye display 302. The near-eye display 302 may include a transmissive display 308 and a diffractive micro-lens array 310. In an embodiment, the near-eye display 302 may be embedded in or attached to the optical lens 304 so that incoming light from a real world scene passes through the transmissive display 308 and the micro-lens array 310 before reaching the user's eye lens 180.

In various embodiments, the near-eye display 302 may include two substrate layers 314 and/or a spacer 312 positioned between the transmissive display 308 and the diffractive micro-lens array 310. The substrate layers 314 may be glass, plastic, or any other suitable transparent or semi-transparent substrate known in the art. The spacer 312 may be a solid spacer (e.g., glass, plastic, etc.), a liquid spacer (e.g., liquid crystals, etc.), or a gas spacer (e.g., air, titanium oxide, etc.).

In various embodiments, the near-eye display 302 may be fabricated so that the spacer 312 has a thickness of two hundred (200) micrometers, one hundred (100) micrometers, ten (10) micrometers, etc. In an embodiment, the near-eye display 302 may be fabricated to have a total thickness of about one millimeter or less. In an embodiment, the near-eye display 302 may be fabricated so that the distance between the transmissive display 308 and the diffractive micro-lens array 310 is approximately equal to the focal length of the diffractive micro-lens array 310. In an embodiment, the near-eye display 302 may be fabricated so that each mircolens in the micro-lens array 310 is approximately the same size as a pixel.

The micro-lens array 310 may be a partially diffractive and partially transparent diffractive optical element (DOE) having a phase profile and a diffraction efficiency. In an embodiment, the micro-lens array 310 may be fabricated to have a diffraction efficiency of about 50%. In an embodiment, the micro-lens array 310 may be fabricated so that approximately 50% of the light from the real-world scene is not affected by the micro-lens and the other approximately 50% light is focused to form a virtual image of the transmissive display 308 at a distance of about 250 mm or more from the user's eye lens. In an embodiment, the diffraction efficiency of the micro-lens array 310 may be proportional to the phase profile of the micro-lens array 310.

The transmissive display 308 may be any electronic visual display that is transparent or semi-transparent and/or which uses ambient light as an illumination source. The transmissive display 308 may include, or make use of, any or all of a variety of commercially available displays or display technologies, including technologies relating to liquid crystal displays (LCDs), light-emitting diodes (LEDs), organic light-emitting diode (OLEDs), surface-conduction electron-emitter displays (SEDs), electroluminescence (EL) displays, photoluminescence displays, plasma display panels (PDPs), field emission displays (FEDs), nanotube field effect displays, micro-mirror displays, micoelectromechanical (MEMs) displays, electrochromic displays, electrophoretic displays and/or other similar display technologies currently available or which may be developed in the future.

In an embodiment, the transmissive display 308 may be a transmissive or partially transmissive liquid crystal display. Briefly, a liquid crystal display (LCD) is an electronic display that uses light modulating properties of liquid crystals whose reflectance and/or transmittance of light change when an electric field is applied. Liquid crystals may be arranged to form pixels within a transparent or semi-transparent liquid crystal display device. Liquid crystal displays generally do not produce light, and need illumination from ambient light or a light source to produce a visible image. In an embodiment, the transmissive display 308 may be a liquid crystal display that produces a visible image from ambient light.

Figure 3B:
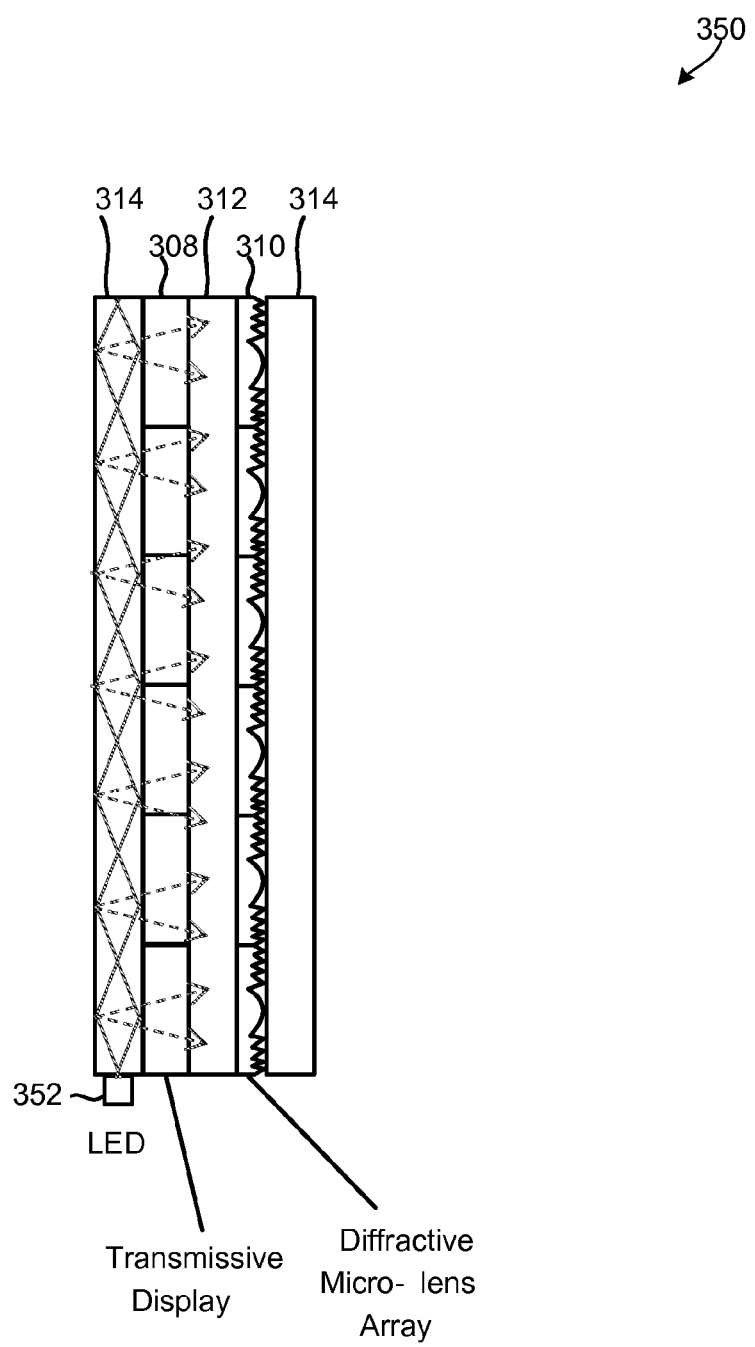
FIG. 3B is an illustration of an embodiment near-eye display system suitable for use in eyeglasses.

FIG. 3B illustrates components of an embodiment near-eye display system 350 suitable for inclusion in a pair of eyeglasses. The near-eye display system 350 may include a transmissive display 308, a diffractive micro-lens array 310, two substrate layers 314, and a spacer 312. The transmissive display 308 may be illuminated by a front light illuminator 352 that includes light sources (e.g., LEDs) coupled into the substrate 314 from the side of the substrate. The light may propagate inside the substrate 314 through total internal reflection, and may be reflected towards the LCD through small reflectors distributed on one of the substrate 314 surfaces. The distribution of the small reflectors may be designed to provide a uniform and efficient illumination on the LCD.

In various embodiments, the transmissive display 308 may be a liquid crystal display that does not include a front light, includes a partial front light, or includes a front light that illuminates the liquid crystal display from the front substrate.

In an embodiment, the transmissive display 308 may be an electronic display that uses light-emitting diodes (LEDs) as an illumination source, such as to produce a visible image on a liquid crystal display. In embodiment, the transmissive display 308 may be partially transmissive LED display.

A light-emitting diode is semiconductor light source that may be used to produce a visible image and/or as a front light on display devices. A light-emitting diode typically includes a semiconducting material doped with impurities to create a p-n junction. Electrons and holes (i.e., charge-carriers) flow into the p-n junction from the electrodes (i.e., the anode and the cathode) when a voltage or current is applied to the light-emitting diode. When an electron meets a hole, it releases energy through the emission of a photon, producing visible light.

In an embodiment, the transmissive display 308 may be an organic light-emitting diode (OLED) display. In conventional light-emitting diodes, the semiconducting material is typically formed from a variety of inorganic materials (e.g., InGaN, GaP, GaN, phosphor, etc.). An organic light-emitting diode (OLED) is a light-emitting diode in which an organic semiconducting material is situated between the two electrodes (i.e., the anode and the cathode), all of which may be disposed on a substrate (e.g., glass, plastic, foil, etc.). OLED displays do not require a backlight, may be fully transparent or semi-transparent when not producing a visible image (e.g., when turned off), and do not consume a significant amount of power. The OLEDs may be printed of a variety of substrates, and may be used in conjunction with, or independent of, liquid crystal display technologies.

For ease of reference, throughout this application, liquid crystal display (LCD) is used as an exemplary technology used by the transmissive display 408. However, it should be noted that the use of LCD terminology in this application is only for purposes of illustration, and should not be construed to limit the scope of the claims to a particular technology unless expressly recited by the claims.

FIGS. 4-7 illustrate light paths in an embodiment near-eye display 400 configured to simultaneously focus light from a real-world scene and light generated from an electronic display on a human retina. In the examples illustrated in FIGS. 4-7, the near-eye display 400 includes a transmissive display 308, a spacer 312, and a diffractive micro-lens array 310. The micro-lens array 310 may be partially diffractive and partially transparent diffractive optical element (DOE) fabricated to diffract a percentage (e.g., about 50%, etc.) of incoming light to the lensing ray path.

In an embodiment, the near-eye display 302 may be fabricated so that the distance between the transmissive display 308 and the diffractive micro-lens array 310 is approximately equal to focal length of the diffractive micro-lens array 310. In an embodiment, the near-eye display 400 may be fabricated so that approximately fifty (50) percent of light emitted from each pixel (or group of pixels) 410 is diffracted and collimated into focus on the retina 182. In an embodiment, the near-eye display 302 may be fabricated so that the percentage of light focused on the retina 182 is proportional to the diffraction efficiency of the micro-lens array 310.

Figure 4:
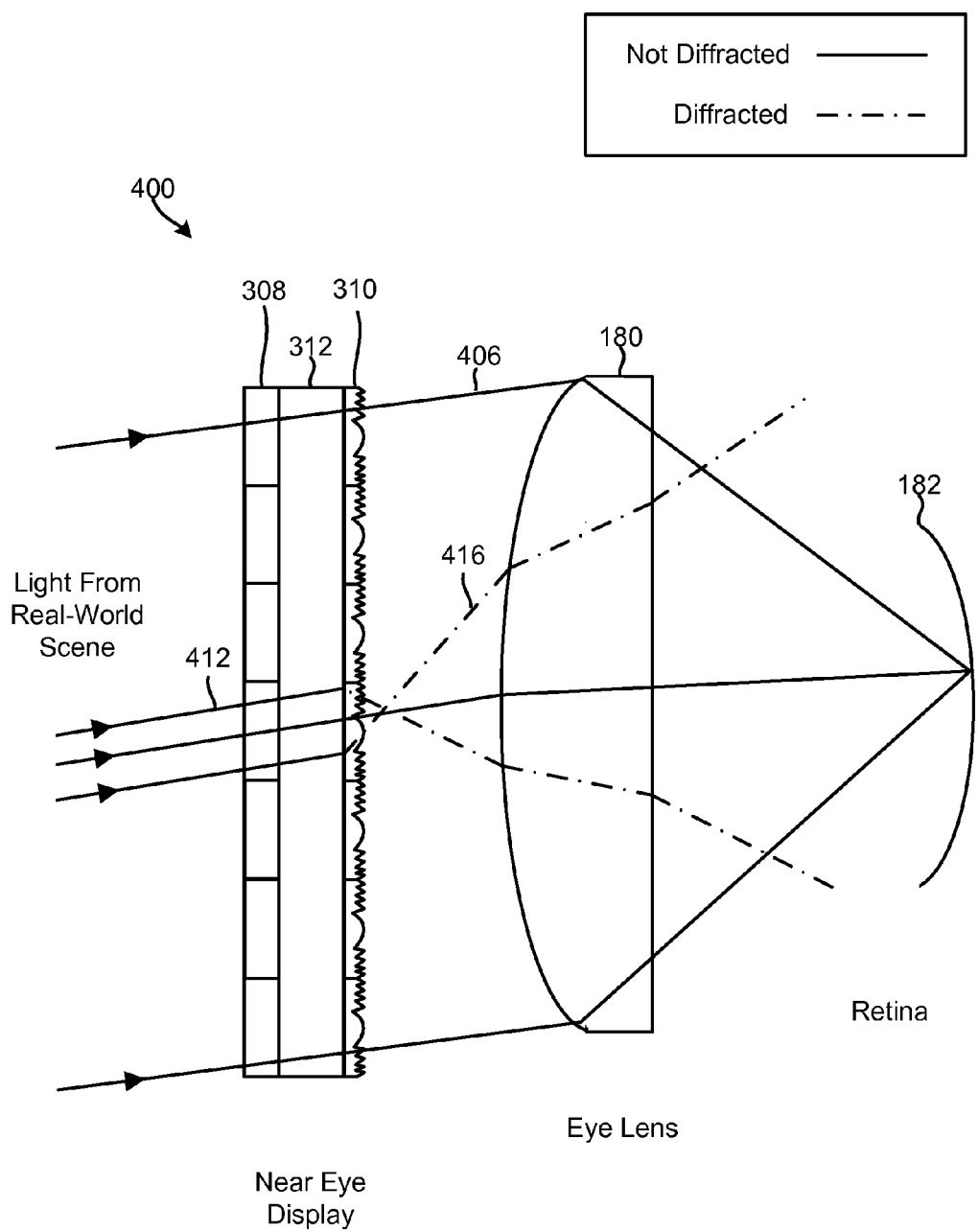
FIGS. 4-7 are ray tracing diagrams that illustrate light paths in an embodiment near-eye display configured to focus light from a real-world scene and light generated from an electronic display on a human retina.

FIG. 4 illustrates that light 412 from the real world scene passes unaltered through the transparent portions of the transmissive display 308 to the micro-lens array 310. A first percentage (e.g., 50%) of light 412 from the real world scene that passes unaltered through the transparent portions of the transmissive display 308 is diffracted by the micro-lens array 310 and a second percentage (e.g., 50%) of the light 412 from the real world scene is not diffracted by the micro-lens array 310. The near-eye display 400 may be fabricated so that the diffracted light 416 is out of focus on the retina and disregarded as scatter light or background noise by the human retina 182. Light 412 from the real world scene that is not diffracted by the micro-lens array 310 (i.e., non-diffracted light 406) is focused by the eye lens on the retina 182 in normal fashion.

When an LCD is used as the transmissive display 308 and ambient light is used as the illumination source, the off state pixel may be transparent while the on state pixel may block or partially block the ambient light passing through the display. In this arrangement, most of the LCD pixels that do not display information are transparent and allow the real world scene to be seen by the wearer, while a small amount of pixels display image (e.g., text, etc.) appear to be merged in the real world scene to provide information about the scene (e.g., map direction, etc.).

Figure 5:
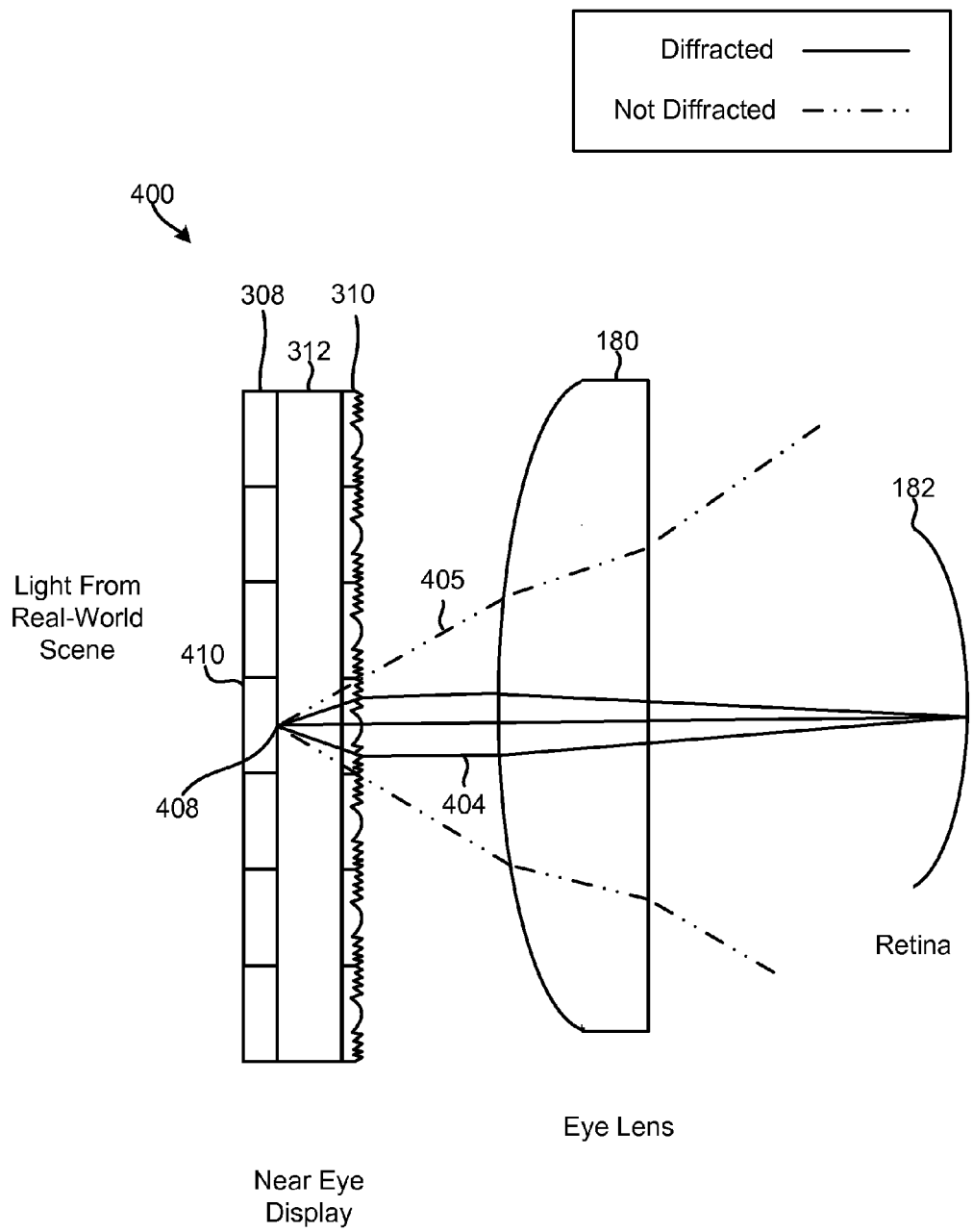

FIG. 5 illustrates that when an illumination source (e.g., LED, etc.) of the transmissive display 308 is powered and/or the pixels 410 are turned on, light is emitted from an LED or reduced light through LCD travels through the pixels 410 in the transmissive display 308 to the micro-lens array 310. A first percentage (e.g., about 50%) of light 408 emitted from the transmissive display 308 is diffracted by the micro-lens array 310 (i.e., diffracted light 404) and a second percentage (e.g., about 50%) of the light 408 emitted from the transmissive display 308 is not diffracted by the micro-lens array 310 (i.e., non-diffracted light 405). The near-eye display 400 may be fabricated so that the diffracted light 404 is collimated and subsequently focused on the retina 182 by the eye lens 180, and the non-diffracted light 405 passes through, out of focus, so that it may be disregarded as scatter light or background noise by the human retina 182. This may be achieved by fabricating the near-eye display 302 so that the distance between the transmissive display 308 and the diffractive micro-lens array 310 is approximately equal to focal length of the diffractive micro-lens array 310.

Figure 6:
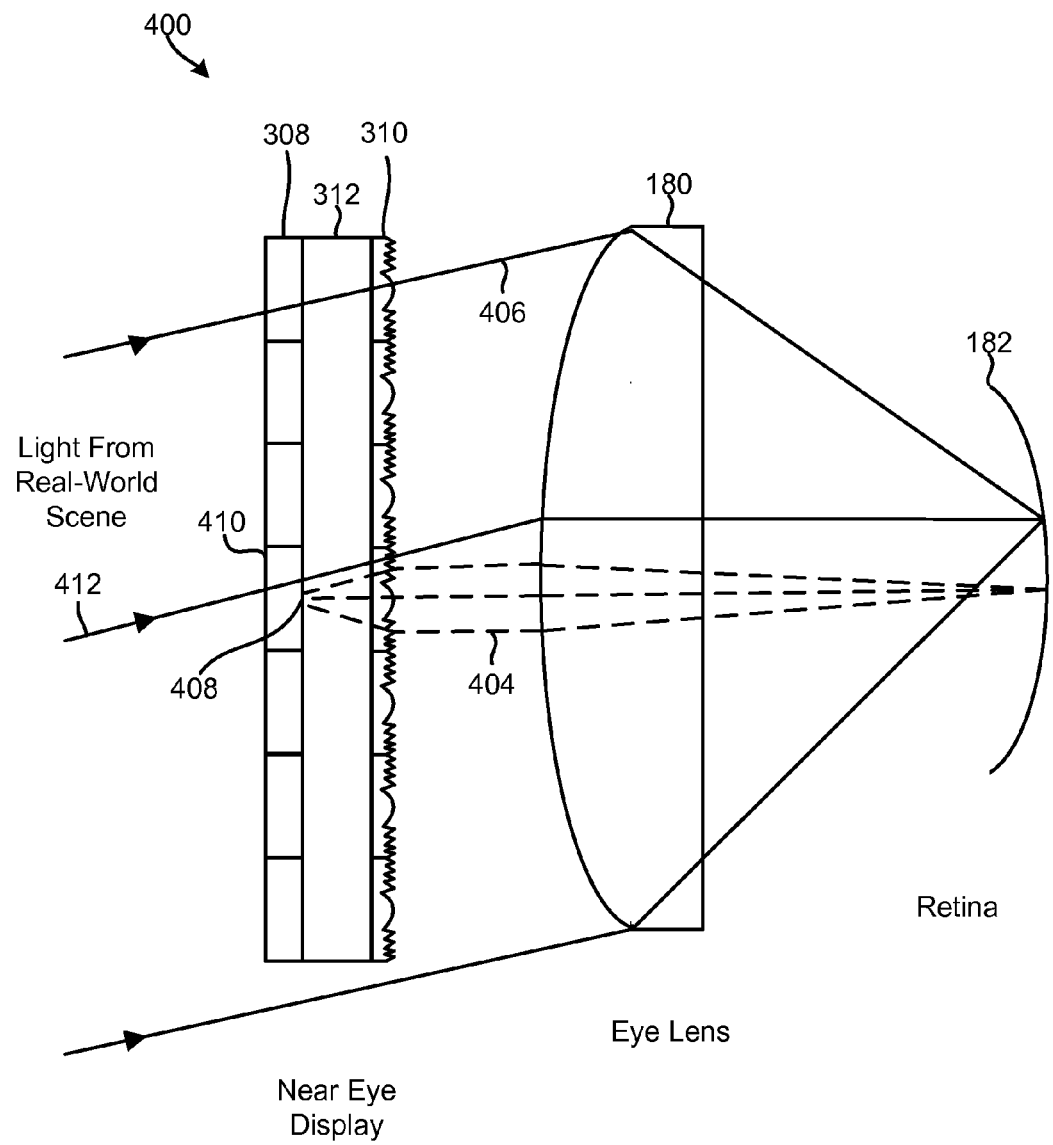

FIG. 6 illustrates that non-diffracted light 406 from the real world scene and diffracted light 404 from the transmissive display 308 may be simultaneously focused on the human retina 182. As discussed above, light 412 from the real world scene that passes unaltered through the transparent portions of the transmissive display 308 and is not diffracted by the micro-lens array 310 (i.e., non-diffracted light 406) is naturally collimated because the light source is at infinity; it is subsequently focused on the retina 182 by the eye lens 180 in the normal fashion. As discussed above, the near-eye display 400 may be fabricated so that the light 408 emitted from the transmissive display 308 and diffracted by the micro-lens array 310 (i.e., diffracted light 404) is collimated by the micro-lens 310 and subsequently focused on the retina 182 by the eye lens 180. In an embodiment, the near-eye display 400 may be fabricated so that the light 408 emitted from the transmissive display 308 and diffracted by the micro-lens array 310 is focused on the retina 182 in a manner that enables the display pixels to form a virtual image at a distance of about 250 mm or more from the eye.

Figure 7:
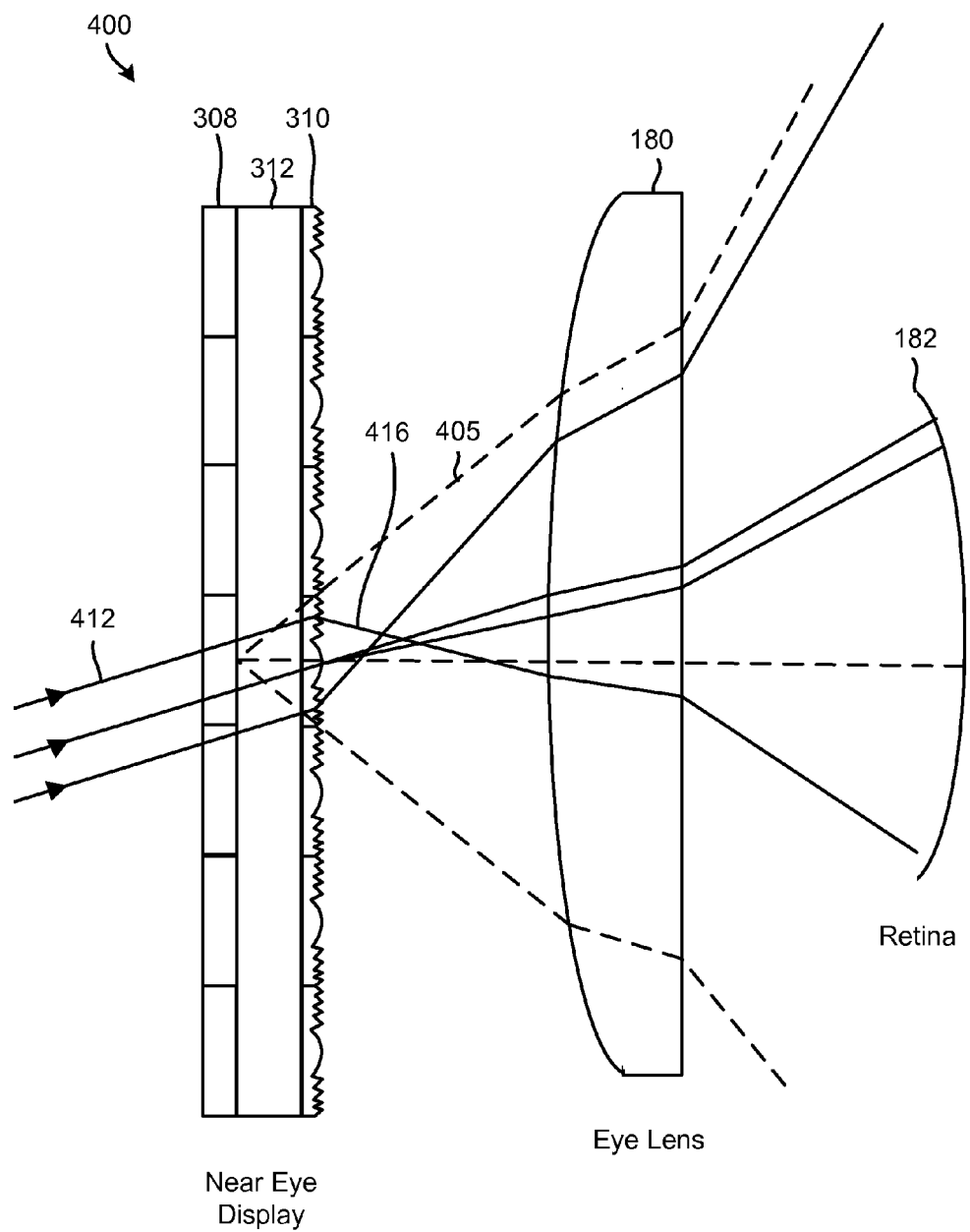

FIG. 7 illustrates that diffracted light 416 from the real world scene and non-diffracted light 405 from the transmissive display 308 are not focused on the retina 182 and/or are disregarded by the human brain as scatter light or background noise. That is, due to the distance between the transmissive display 308 and the diffractive micro-lens array 310 (e.g., approximately equal to focal length of the diffractive micro-lens array 310), the diffracted light 416 is diffracted out of focus so that it may be disregarded by the retina as background noise. Likewise, the due to the close proximity of the transmissive display 308 to the eye lens 180, the non-diffracted light 405 originating from the transmissive display 308 is also out of focus and/or disregarded by the retina 182 as background noise.

In the various embodiment, the diffraction efficiency of the micro-lens array 310 may controlled by fabricating the micro-lens array 310 to have a specific phase profile and/or a plurality of deviations having various depths, the frequency and sizes of which may control the percentage of light diffracted and/or focused on the retina 182. In an embodiment, the micro-lens array 410 may be shaped so that the other ~50% light from the display pixel is nearly collimated in a manner that enables the display pixels to form a virtual image at a distance of about 250 mm or more from the eye.

In an embodiment, the micro-lens array 310 may be fabricated on a glass substrate using lithographic methods, similar to those used in silicon chip manufacturing. In this embodiment, very small lenses may be formed in a glass substrate by selective etching using photo lithography followed by subtractive processes, such as etching, to transfer a phase profile onto glass surface. Photolithographic techniques may be used to form the tiny lens structure of the micro-lens array 310. The lens structure may include small lenses that cover approximately 50% of the surface area of each lens, while the rest of the surface area may be formed to enable light to pass through the lens un-diffracted.

In an embodiment, the micro structure of the micro-lens array fabricated by photolithographic technique may cover approximately 100% of the surface area of each lens, while the diffraction efficiency of the each lens is about 50%. In this arrangement, 50% of the incoming light will be diffracted and 50% of the incoming light will not be diffracted. As such, 50% of the light from the display pixels and 50% of the light from the real world scene will be focused on the retina simultaneously.

In an embodiment, the micro-lenses and/or micro-lens array 310 may be fabricated using a holographic method. The micro-lenses and/or micro-lens array 310 may include volume holographic micro-lenses fabricated to focus the electronic image on the retina while eliminating image cross-talk between the adjacent lenses. For example, the volume holographic micro-lenses may be fabricated so that only light from the pixels associated with their companion lens element in the micro micro-lens array are diffracted, and so that light from neighboring pixels do not satisfy the Bragg condition and will not be diffracted.

In an embodiment, the micro-lens array 310 may be a holographic micro-lens array fabricated via a holographic recording method through the coherent interference of two waves. In an embodiment, the holographic micro-lens array 310 may be fabricated by recording a hologram on a holographic medium, for example, a photopolymer film to generate an optic diffractive optical element. The diffraction efficiency of the holographic micro-lens array 310 may be controlled by varying the exposure time of the photopolymer to achieve a precise refractive index modulation. The holographic micro-lens may be fabricated on a photopolymer film that may be applied to the back of the transmissive display 308. In an embodiment, the photopolymer film may be between about 10 micrometers and about 30 micrometers in thickness. In an embodiment, the photopolymer film may be less than about 10 micrometers in thickness.

Figure 8:
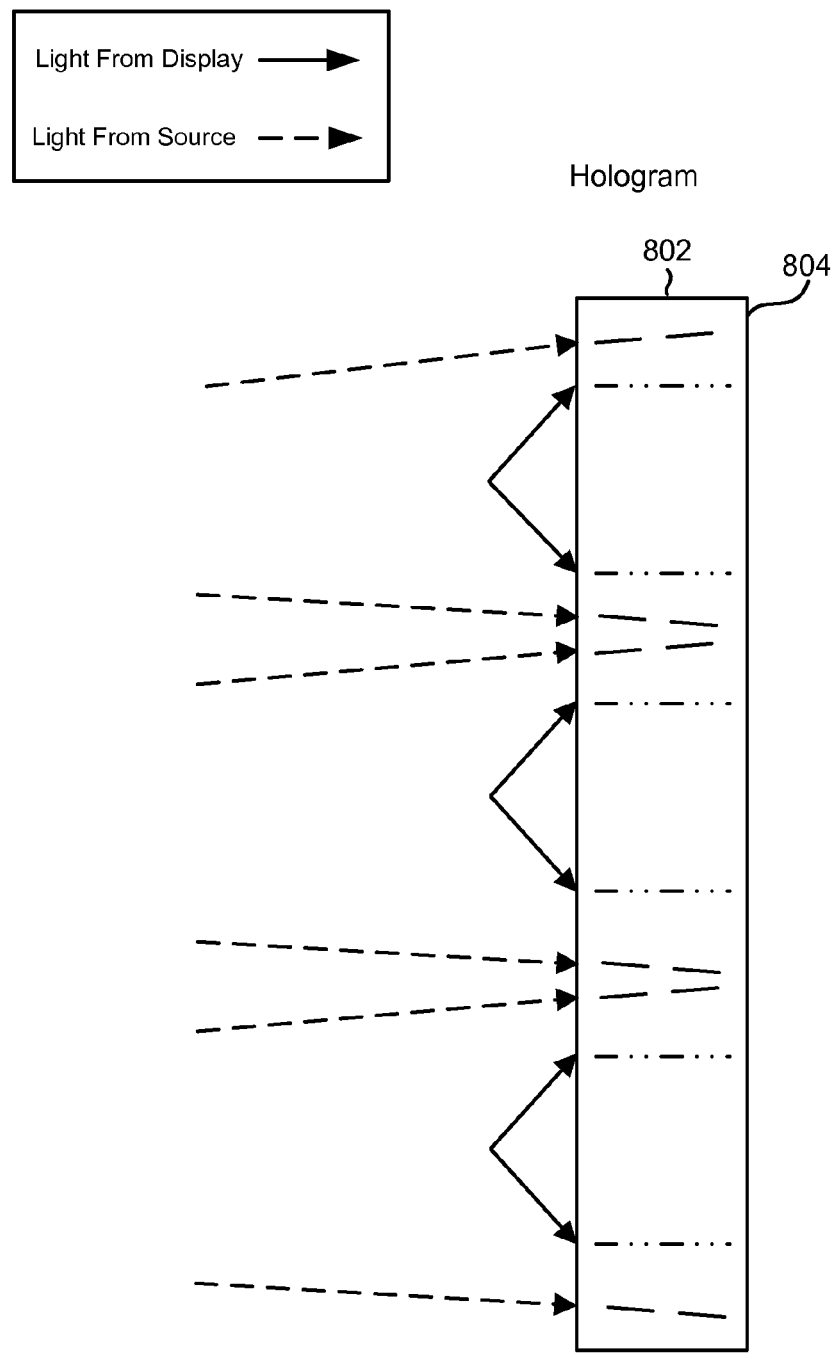
FIG. 8 is an illustration of a holographic micro-lens array having a diffraction pattern suitable for use in an embodiment near-eye display.

FIG. 8 is an illustration of recording holographic micro-lens array 802 having a diffraction pattern suitable for use in an embodiment near-eye display. The holographic micro-lens array 802 may be fabricated by exposing a photographic film 804 with light from a laser that follows two paths, one path emanating from points positioned where a transmissive display will be relative to the photographic film 804, and the other path from a source (e.g., real world scene) more than 250 mm in distance from the holographic micro-lens array. The holographic micro-lens array 802 may be fabricated so that light waves from these two sources (i.e., transmissive display and source) form a diffraction pattern, which when recorded in the photographic film, generates a holographic optical element in the form of the holographic micro-lens array 802.

In an embodiment, the micro-lens array 310 may be fabricated with a holographic printing technique. A holographic printer is able to calculate the interference fringe patterns correspond to the interference of two waves depicted in FIG. 8 and writes the fringes with a focused beam (or beams) into a photosensitive material that will change the refractive index after exposure to light.

Figure 9:
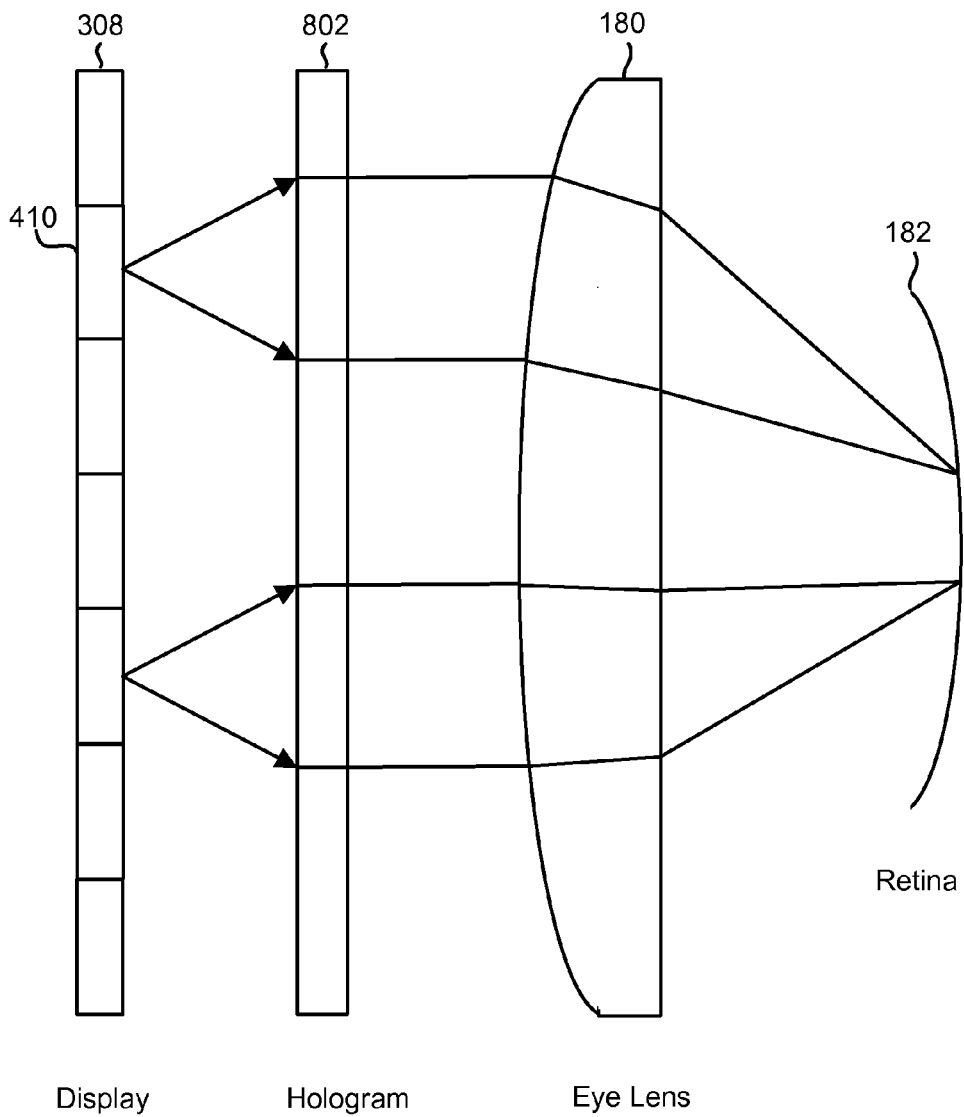
FIG. 9 is an illustration of an embodiment near-eye display system having a holographic micro-lens array configured to form an image in close proximity to a human eye so that the formed image appears at a distance from the human eye.

FIG. 9 illustrates that when light from a display pixel 410 located at the focus or focal point of the recording wave near the hologram 802 strikes the photographic film 802, the holographic micro-lens array 802 may form a virtual image of the pixel 410 so that the image appears to be greater than 250 mm from the eye lens 180 and/or so that the eye may view the image while focused at infinity.

One of the advantages of including a volume hologram as the micro-lens array is its ability to eliminate pixel crosstalk, because light from neighboring pixel will not be able to reconstruct the virtual image wave due to Bragg mismatch. A diffractive optical lens may be associated with chromatic aberration that will affect the image quality on retina. Since aberration is linearly proportional to lens focal length (with a fixed F number), when lens size is small, the aberration can be significantly reduced.

In various embodiments, the holographic micro-lens array 802 may be a diffractive optical lens having a narrow band response, which may eliminate chromatic aberration. In an embodiment, the micro-lens array may be fabricated to include a sufficiently narrow band diffractive lens that light from a narrow spectrum band "sees" the hologram and is diffracted to form a sharp image on retina, whereas light outside of the spectrum band will not "see" the hologram and will be unaffected. Such diffractive lens can be made as a volume hologram.

In various embodiments, the near-eye display may be included as part of a head mounted display (HMD) system (e.g., helmet, eyeglasses, etc.), which may include a processor, a memory, a display and/or a camera in a single device (e.g., eyeglasses) or may be configured to operate as an accessory to a mobile device processor (e.g., the processor of a cell phone, tablet computer, smartphone, etc.).

Figure 10:
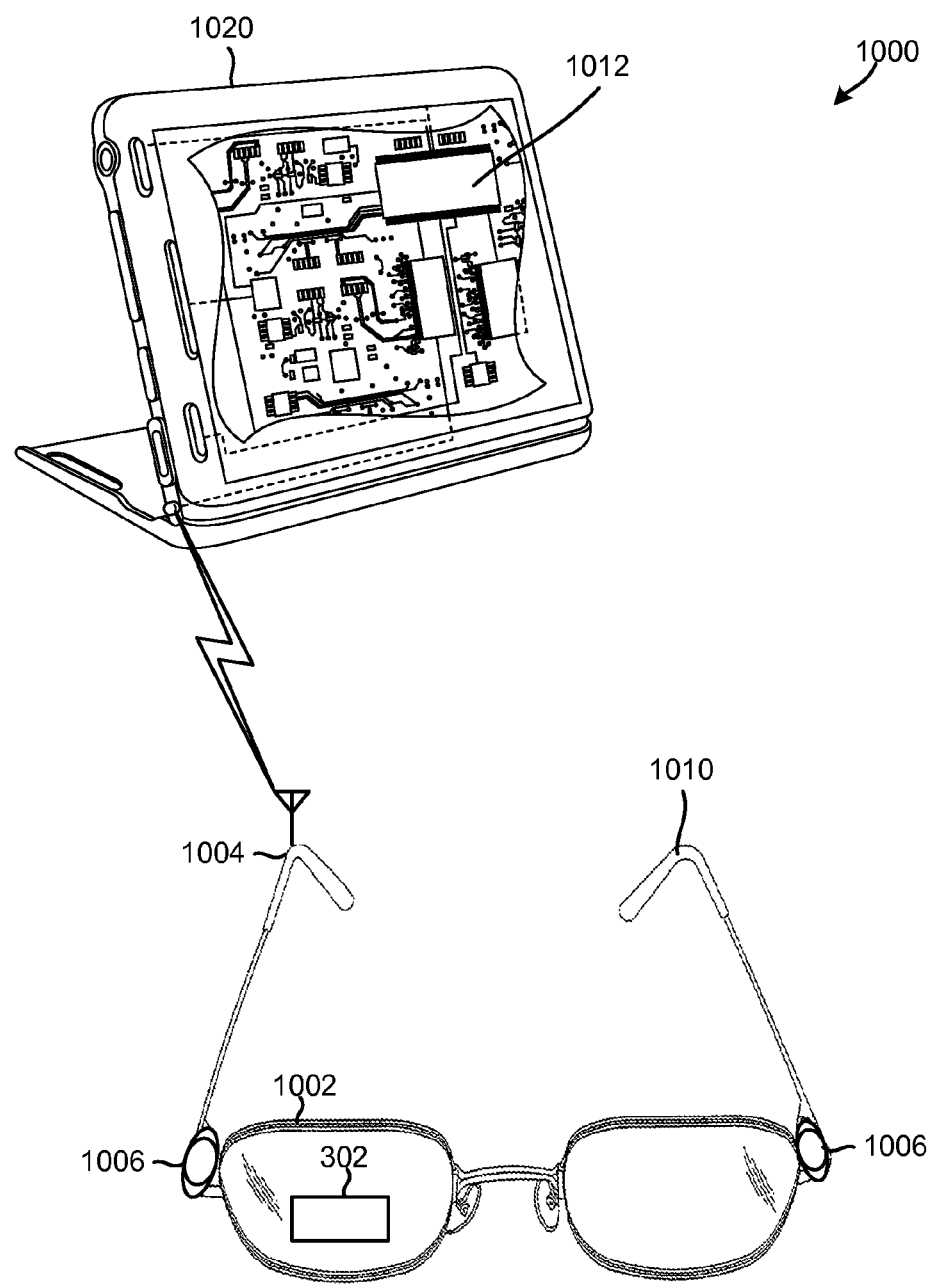
FIG. 10 is a block diagram illustrating example components of an embodiment head mounted display (HMD) system.

FIG. 10 illustrates example components of an embodiment head mounted display (HMD) system 1000. The head mounted display system 1000 includes eyeglasses 1010 configured to operate as an accessory to a mobile device 1020. The eyeglasses 1010 may include an optical lens 1002 having a near-eye display 302, and a wireless radio 1004 and/or a wireless interface and/or circuitry for sending and/or receiving information to and from the mobile device 1020. The near-eye display system 1000 may also include one or more sensors 1006, such as cameras, microphones, eye tracking components, accelerometers, gyroscopes, magnetic sensors, optical sensors, mechanical or electronic level sensors, inertial sensors, electronic compasses, and other known sensors that may be included in modern mobile electronic devices. Information collected from the sensors 1006 may be transmitted to the mobile device 1020 coupled to the eyeglasses 1010 via the wireless radio 1004.

In various embodiments, the sensors 1006 may include one or more sensors for scanning or collecting information (e.g., light, location of objects, etc.) from the user's environment (e.g., room, etc.), distance measuring sensors (e.g., a laser or sonic range finder) configured to measure distances to various objects present in the user's environment, sensors for detecting user inputs, sensors configured to collection information regarding the up/down/level orientation of the near-eye display 302 (e.g., by sensing the gravity force orientation), the user's head position/orientation (and from that viewing perspective), and/or regarding left/right orientation and movement. In an embodiment, the sensors 1006 may include one or more sensors configured to detect user inputs, such as spoken voice commands, gestures (e.g., hand movements), eye movements, and other forms of inputs which when recognized by the mobile device 1020, may cause that device to execute a specific or corresponding command or operation.

In an embodiment, the sensors 1006 may include an eye tracking component configured to track a location of the user's eye relative to the near-eye display 302. The eye tracking component may communicate with the mobile device 1020 so that the mobile device processor 1012 may generate images for display on near-eye display 302 relative to the position of the user's eye and/or based on real-world images present in the users line of view. The eye tracking component may also detect eye movements (blinks, left motion, right motion, up motion, down motion, etc.) as a source of user input, and communication the detected user inputs to the mobile device 1020. In an embodiment, the eye tracking component may be configured to obtain an image of the user's eye and determine the location of the pupil within the eye socket.

In an embodiment, the sensors 1006 may include a microphone for capturing verbal user inputs or commands, which may be communicated to the mobile device 1020 via the wireless radio 1004. The processor 1012 may receive audio signals from the microphone and process the received audio signals using speech recognition processes/techniques. In an embodiment, the processor 1012 may be configured to compare received audio signals to audio patterns of one or more commands stored in a memory in order to recognize a spoken command. For example, the processor 1012 may be configured to monitor audio inputs for a few predetermined command words. The processor 1012 may be configured to apply a detection algorithm to the received audio so that it only responds to particular predefined audio commands, or commands proceeded by a predefined attention command (e.g., "computer" or "execute" etc.). The processor 1012 may be configured to recognize these spoken words as a command input, and implement corresponding actions to update the images displayed on the near-eye display 302.

In an embodiment, the main processing of the head mounted display system 1000 may be performed on a processor 1012 of the mobile device 1020. In an embodiment, the processor 1012 may be configured to perform various image processing and data analysis operations, such as analyzing images captured by the sensors 1006 (e.g., a camera) to estimate distances to objects (e.g., via trigonometric analysis of stereo images), perform facial recognition operations, identify logos, perform keyword or picture searches, etc.

In an embodiment, the processor 1012 may be configured to generate a virtual object for display on the near-eye display 302. The processor 1012 may be configured to calculate display-relevant parameters, including distance and orientation with respect to the sensors 1006 that correspond to a display location of the virtual object. The virtual object may be any virtual object, including, for example, text, graphics, images and 3D shapes. When presented on the near-eye display 302, the virtual object may be positioned at/on designated locations within the surrounding environment to create the experience of augmented reality and/or enable user interactions with the virtual object. The sensors 1006 may enable natural interactions with the virtual objects and digital assets (e.g., documents, pictures, videos, etc.) via gesture controls, touch manipulations, highlighting portions of the virtual object, etc. Recognizable gestures may be stored or organized in the form of a gesture dictionary that stores movement data or patterns for recognizing gestures, including pokes, pats, taps, pushes, guiding, flicks, turning, rotating, grabbing and pulling, two hands with palms open for panning images, drawing (e.g., finger painting), forming shapes with fingers (e.g., an "OK" sign), and swipes, all of which may be accomplished on, in close proximity to, or addressing the direction of (in relation to the user) the apparent location of a virtual object in a generated display.

Figure 11:
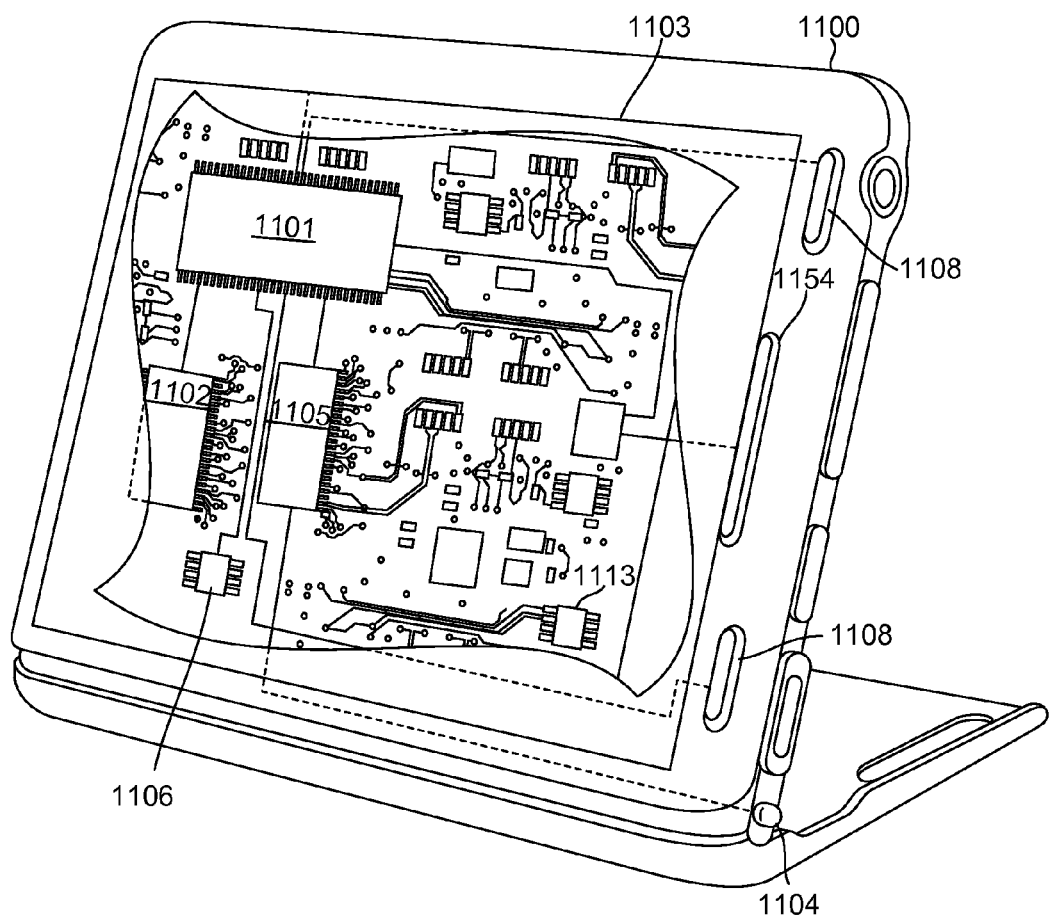
FIG. 11 is a block diagram of a mobile computing device suitable for use with the various embodiments.

FIG. 11 is a system block diagram of a mobile device suitable for use with any of the embodiments. A typical mobile device 1100 may include a processor 1101 coupled to internal memory 1102, a display 1103, and to a speaker 1154. Additionally, the mobile device 1100 may include an antenna 1104 for sending and receiving electromagnetic radiation that may be connected to a wireless data link and/or cellular telephone transceiver 1105 coupled to the processor 1101 and a mobile multimedia broadcast receiver 1106 coupled to the processor 1101. Mobile devices 1100 typically also include menu selection buttons or rocker switches 1108 for receiving user inputs.

The processor 1101 may be any programmable microprocessor, microcomputer or multiple processor chip or chips that can be configured by software instructions (applications) to perform a variety of functions, including the functions of the various embodiments described above. In some devices, multiple processors 1101 may be provided, such as one processor dedicated to wireless communication functions and one processor dedicated to running other applications. Typically, software applications may be stored in the internal memory 1102 before they are accessed and loaded into the processor 1101. The processor 1101 may include internal memory sufficient to store the application software instructions. In many devices the internal memory may be a volatile or nonvolatile memory, such as flash memory, or a mixture of both. For the purposes of this description, a general reference to memory refers to memory accessible by the processor 1101 including internal memory or removable memory plugged into the device and memory within the processor 1101 itself The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A near-eye display for wearing by a user, comprising:
    a transmissive electronic display configured to emit light; and
    a diffractive micro-lens array positioned between the transmissive electronic display and an eye of the user such that light directed toward the user passes through the diffractive micro-lens array before reaching the eye of the user, the light directed toward the user comprising light from a real world scene and light emitted from the transmissive electronic display,
    wherein:
        the diffractive micro-lens array diffracts a first percentage of the light emitted from the transmissive electronic display, and
        the diffractive micro-lens array allows a second percentage of the light emitted from the transmissive electronic display to pass therethrough not diffracted,
        the second percentage of the light emitted from the transmissive electronic display is out of focus at a point of a retina of the eye,
        the first percentage of the light emitted from the transmissive electronic display is focused at the point of the retina to form a virtual image that appears to the user to originate at a distance that is greater than or equal to 250 mm from the eye, and
        the distance between the transmissive electronic display and the diffractive micro-lens array is about a focal length of the diffractive micro-lens array.

2. The near-eye display of claim 1, wherein the diffractive micro-lens array is partially diffractive and partially transparent.

3. The near-eye display of claim 1, wherein:
    the transmissive electronic display includes a plurality of pixels; and
    the diffractive micro-lens array is positioned relative to the plurality of pixels so that about fifty percent of light emitted from each pixel is diffracted into focus on the point of the retina of the eye when focused at infinity.

4. The near-eye display of claim 1, wherein:
    the transmissive electronic display includes a plurality of transparent portions through which the light from the real world scene passes unaltered; and
    the diffractive micro-lens array is positioned relative to the transmissive electronic display to receive the light from the real world scene through the plurality of transparent portions.

5. The near-eye display of claim 4, wherein the diffractive micro-lens array is positioned relative to the transmissive electronic display so that about fifty percent of the light from the real world scene that passes unaltered through the plurality of transparent portions of the transmissive electronic display passes through the diffractive micro-lens array not diffracted and is focused at a second point on the retina to form a second an image on the retina of the eye.

6. The near-eye display of claim 5, wherein the diffractive micro-lens array is positioned relative to the transmissive electronic display so that about fifty percent of the light from the real world scene that passes unaltered through the plurality of transparent portions of the transmissive electronic display is diffracted by the diffractive micro-lens array out of focus of the retina of the eye when focused at infinity.

7. The near-eye display of claim 1, wherein the diffractive micro-lens array is fabricated on a glass substrate.

8. The near-eye display of claim 1, wherein the diffractive micro-lens array is fabricated into a photopolymer film as a volume hologram.

9. The near-eye display of claim 1, wherein the diffractive micro-lens array and the transmissive electronic display are fabricated into an optical lens.

10. The near-eye display of claim 1, wherein the transmissive electronic display is a liquid crystal display.

11. The near-eye display of claim 1, wherein the transmissive electronic display is an organic light emitting diode display.

12. The near-eye display of claim 11, wherein the organic light emitting diode display is a transparent organic light emitting diode display.

13. The near-eye display of claim 1, wherein the transmissive electronic display is attached to a pair of eyeglasses.

14. A near-eye display for wearing by a user, comprising:
    means for emitting light; and
    means for receiving light directed toward the user, the light directed toward the user comprising light from a real world scene and light emitted from the means for emitting light;
    the means for receiving the light directed toward the user being positioned between the means for emitting light and an eye of the user such that the light directed toward the user passes through the means for receiving the light directed toward the user before reaching a point of a retina in the eye of the user;
    the means for receiving the light directed toward the user includes:
        means for diffracting a first percentage of the light emitted from the means for emitting light, and
        means for allowing a second percentage of the light emitted from the means for emitting light to pass therethrough not diffracted;
    the second percentage of the light emitted from the means for emitting light is out of focus at a point of a retina of the eye;
    the first percentage of the light emitted from the means for emitting light is focused at the point of the retina to form a virtual image that appears to the user to originate at a distance greater than or equal to 250 mm from the eye; and the means for receiving the light directed toward the user being positioned relative to the means for emitting light such that the distance between the means for receiving the light directed toward the user and the means for emitting light is about a focal length of the means for receiving the light directed toward the user.

15. The near-eye display of claim 14, wherein the means for receiving the light directed toward the user comprises:
means for partially diffracting light from a computer generated image; and
means for partially transmitting the light from the real world scene.

16. The near-eye display of claim 14, wherein:
the means for emitting light comprises means for generating a plurality of pixels; and
the means for diffracting the first percentage of the light emitted from the means for emitting light comprises means for diffracting fifty percent of light emitted from each pixel into focus on the point of the retina of the eye when focused at infinity.

17. The near-eye display of claim 14, wherein:
the means for emitting light comprises a plurality of transparent portions through which the light from the real world scene passes unaltered; and
the means for receiving the light directed toward the user comprises means for receiving the light from the real world scene through the transparent portions.

* * * * *

UNITED STATES PATENT AND TRADEMARK OFFICE
CERTIFICATE OF CORRECTION

PATENT NO. : 10,073,201 B2
APPLICATION NO. : 13/662251
DATED : September 11, 2018
INVENTOR(S) : Jian J. Ma et al.

Page 1 of 1

It is certified that error appears in the above-identified patent and that said Letters Patent is hereby corrected as shown below:

In the Claims

Claim 14, Column 16, Lines 51-52, after 'before reaching,' delete "a point of a retina in".

Signed and Sealed this
Sixth Day of November, 2018

Andrei Iancu
*Director of the United States Patent and Trademark Office*